UNITED STATES PATENT OFFICE.

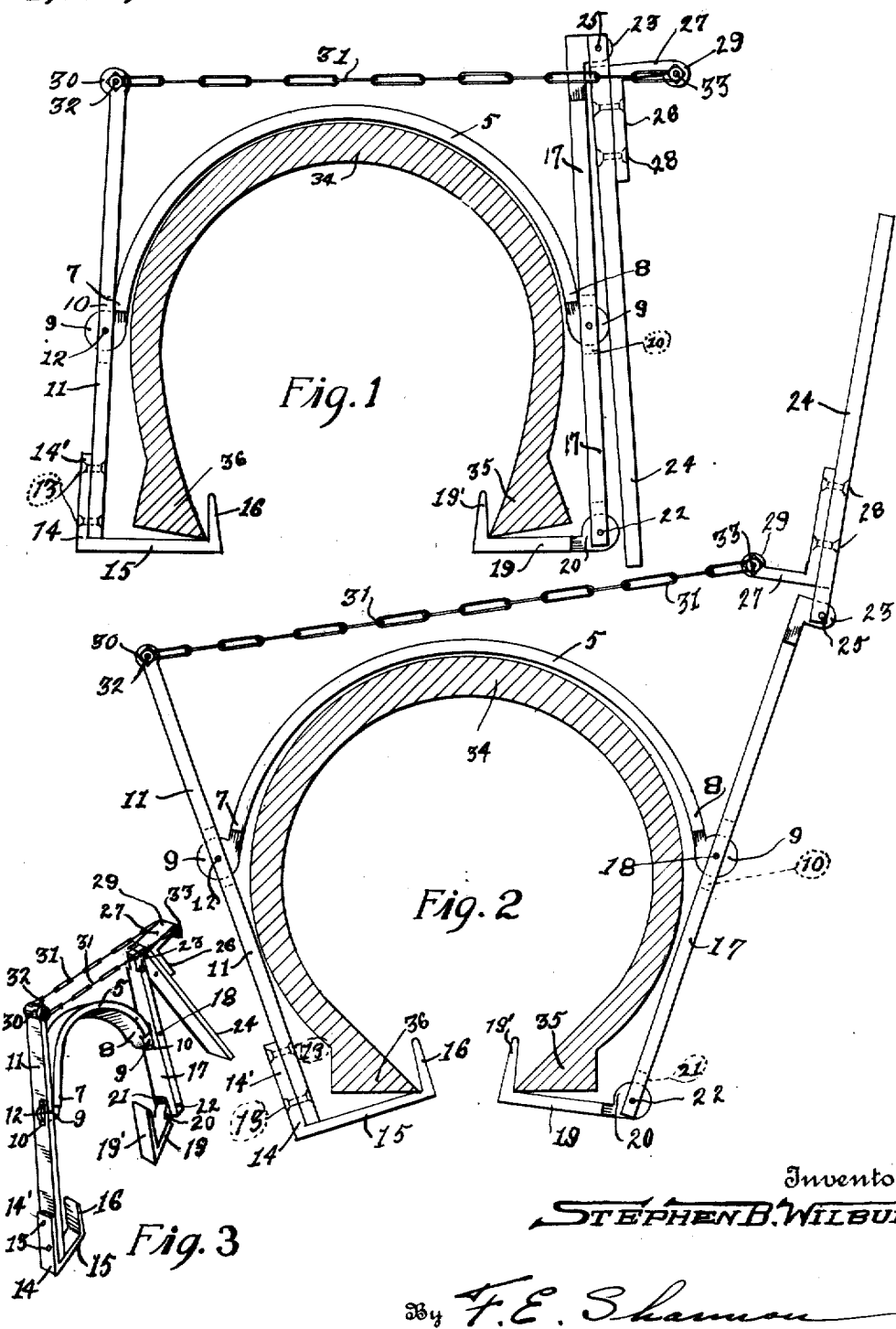

STEPHEN B. WILBUR, OF AKRON, OHIO.

TIRE-SPREADER.

1,349,990.　　　　Specification of Letters Patent.　　Patented Aug. 17, 1920.

Application filed May 15, 1920. Serial No. 381,685.

*To all whom it may concern:*

Be it known that I, STEPHEN B. WILBUR, a citizen of the United States, residing at Akron, in the county of Summit and State of Ohio, have invented new and useful Improvements in Tire Spreaders, of which the following is a specification.

This invention relates to improvements in tire spreaders and has particular relation to a device which may be used to spread apart the inner circumferential edges of a pneumatic tire casing.

Objects of the invention are to provide a strong, durable device of the character above designated, which is of simple, economical construction, and which will be easily operated and convenient to use.

A particular object resides in a provision of the device which in use will quickly and effectually spread apart the bead edges of a pneumatic tire casing and which will securely hold said casing in an open position with the opening free and unobstructed so that an inner tube may be positioned therein, or repairs made or other work performed on the interior of the tire without interference with any portion of the device.

A further object is to provide a device which will accomplish the above objects, which may be used on tires of various sizes and which may be quickly and easily positioned on a tire and operated, and quickly and easily removed therefrom.

The above and other objects are accomplished by the novel construction, combination and arrangement of parts hereinafter described and illustrated in the accompanying drawings in which I have shown a preferred embodiment of the invention, it being understood that the invention is capable of various adaptations and that changes, variations and modifications may be made or substitutions resorted to which come within the spirit of the invention or the scope of the claims hereunto appended.

In the drawings in which I have illustrated an embodiment of the invention and in which I have employed similar numerals of reference to designate similar parts throughout the several views, Figure 1 is a side elevation of a device constructed in accordance with this invention, showing the same as operatively positioned on a pneumatic tire casing, the casing being shown in transverse section.

Fig. 2 is a similar side elevation of the same showing the device as applied to a tire casing, preparatory to spreading same and also showing a transverse sectional view of a tire, and, Fig. 3 is a perspective view of an embodiment of my invention.

Referring now to a detailed description of the drawings, the numeral 5 is employed to designate a central arcuate member which is shaped to approximately conform with the transverse curvature of the peripheral and lateral portions of a tire. One end of the member 5 is designated by the numeral 7 and the other end by the numeral 8. Each end 7 and 8 is provided with an outwardly projecting rounded portion constituting an eye 9 having a circular aperture extending therethrough, transversely to the member 5. The eye 9 in the end 7 is positioned in the slot 10 in the arm 11 and is pivotally secured therein by the pin 12. Rigidly fixed to the lower end of the side member 11 by the bolts 13 or other suitable means, is the hook 14 which has an overlapping attaching portion 14′ and an inwardly projecting portion 15 which extends at a right angle to the side member 11 and terminates in an upwardly directed portion 16 as clearly shown in Figs. 1 and 2. The eye 9 on the end 8 of the frame 5 is positioned in the slot 10 in the member 17 and is pivotally secured therein by the pin 18. A hook 19 having an end portion 19′ which extends upwardly at a right angle thereto is provided with an eye 20 which is pivotally secured in the slot 21 on the downwardly extending end of the member 17 by the pin 22. The other end of the arm 17 is provided with an eye 23 which is pivotally secured, by means of the pin 25 to one end of the operating handle 24. An angle member 26 is rigidly attached to the handle 24 adjacent its attached end by means of the bolts 28. The said angle member having an outwardly projecting portion 27 which terminates in a rounded eye 29. The upper end of the side member 11 is provided with an eye 30. An inextensive flexible member 31 is detachably secured to each side of the member 11 by means of the bolt 32 which is positioned in the eye 30. The other end of each member 31 being similarly secured in the eye 29 on the angle member 26. The members 31 are represented in the drawing as chains and are secured to the angle member 26 by means of a bolt 33 running through a link in said chain and through the eye 29. The other end of the chain being similarly secured to the member by the bolt 32 which is positioned in the eye 30.

In use, the free end of the handle 24 is swung outwardly away from the arm 17 as shown in Fig. 2. A hook 14 on the arm 11 is forced under the bead edge 35 of the tire 34. The arm 19 is then swung into contact with the bead 35 with the end portion 19' positioned against the inner edge of the bead. The free end of the handle 24 is then swung toward and into approximate contact with the member 17 as shown in Fig. 1, thus moving the upwardly extending ends of the members 11 and 17 toward each other and forcing the hook 19 away from the hook 14. The beads 35 and 36 are thus forced apart and held in this position inasmuch as the chain 31 is below the eye 23.

It will thus be seen that the tire is held open and no portion of the device will interfere with the work to be performed on the interior of the tire.

While I have shown and described the device as positioned on the upper portion of a tire, it is to be understood that it may be used in any position and that one or more of the devices may be employed on a tire at the same time.

Having thus described my invention what I claim as new and desire to secure by Letters Patent is:—

1. In a device of the class described, a central member, two side members, each end of said central member pivotally connected to the central portion of one of said side members, similar ends of each side member provided with means to engage the bead edge of a tire and means to swing said side arms on said central member and force said similar ends apart.

2. In a device of the class described, a central member shaped to conform to the transverse curvature of the peripheral and lateral portions of a pneumatic tire casing, an eye on each end of said member, two side bars, each of said eyes pivotally secured in a longitudinally directed slot positioned in the central portion of each of said bars similar ends of said bars provided with means to engage the bead edges of a tire casing, means associated with the other ends of said bars to move similar ends thereof to and from each other.

3. In a device of the class described, a central member shaped to conform to the transverse curvature of the peripheral and lateral portions of a pneumatic tire casing, an eye on each end of said member, two side bars, each of said eyes pivotally secured in a longitudinally directed slot positioned in the central portion of each of said bars similar ends of said bars provided with means to engage the bead edges of a tire casing, means associated with the other ends of said bars to move similar ends thereof to and from each other, said means comprising a lever fulcrumed on one of said bars, said lever provided with a load carrying arm and means to operatively connect said arm to the other bar.

In testimony whereof I have hereunto set my hand.

STEPHEN B. WILBUR.